US012706411B2

(12) United States Patent
M. et al.

(10) Patent No.: US 12,706,411 B2
(45) Date of Patent: Aug. 11, 2026

(54) HOUSING PART FOR AN ELECTRICAL CONNECTOR WITH IMPROVED MATING CHARACTERISTICS

(71) Applicants: TE Connectivity India Private Limited, Bangalore (IN); TE Connectivity Germany GmbH, Bensheim (DE)

(72) Inventors: Chethan M., Bangalore (IN); Vishnu Patagar, Bangalore (IN); Sebastian Helm, Bensheim (DE); Kirstin Schang, Bensheim (DE); Joachim Barth, Bensheim (DE)

(73) Assignees: TE Connectivity Germany GmbH, Bensheim (DE); TE Connectivity India Private Limited, Bangalore (IN)

( * ) Notice: Subject to any disclaimer, the term of this patent is extended or adjusted under 35 U.S.C. 154(b) by 575 days.

(21) Appl. No.: 18/155,174

(22) Filed: Jan. 17, 2023

(65) Prior Publication Data

US 2023/0231337 A1 Jul. 20, 2023

(30) Foreign Application Priority Data

Jan. 17, 2022 (IN) ............................. 202241002555

(51) Int. Cl.
*H01R 13/50* (2006.01)
*H01R 13/52* (2006.01)

(52) U.S. Cl.
CPC ......... *H01R 13/50* (2013.01); *H01R 13/5219* (2013.01)

(58) Field of Classification Search
CPC .. H01R 13/50; H01R 13/5219; H01R 13/629; H01R 13/631; H01R 13/502; H01R 13/5202
See application file for complete search history.

(56) References Cited

U.S. PATENT DOCUMENTS

| | | | | |
|---|---|---|---|---|
| 5,637,019 A * | 6/1997 | Crane, Jr. | H01R 13/64 439/374 |
| 6,514,098 B2 * | 2/2003 | Marpoe, Jr. | H01R 13/64 439/352 |
| 10,355,413 B2 * | 7/2019 | Leconte | H01R 13/5219 |
| 11,342,714 B2 * | 5/2022 | Helm | H01R 13/6597 |
| 2008/0102683 A1 * | 5/2008 | Menez | H01R 13/5219 439/345 |
| 2020/0366033 A1 * | 11/2020 | Helm | H01R 13/6582 |
| 2023/0231337 A1 * | 7/2023 | M | H01R 13/50 439/271 |

OTHER PUBLICATIONS

Extended European Search Report from the European Patent Office dated Jun. 14, 2023, corresponding to Application No. 23151928. 1-1201, 7 pages.

* cited by examiner

*Primary Examiner* — Abdullah A Riyami
*Assistant Examiner* — Nader J Alhawamdeh
(74) *Attorney, Agent, or Firm* — Barley Snyder

(57) ABSTRACT

A housing part for an electrical connector includes a housing wall adjacent to an opening. The housing wall has a front edge with a chamfer on a side of the housing wall. The chamfer extends away from the front edge by a distance that varies along the front edge.

15 Claims, 2 Drawing Sheets

HOUSING PART FOR AN ELECTRICAL CONNECTOR WITH IMPROVED MATING CHARACTERISTICS

CROSS-REFERENCE TO RELATED APPLICATIONS

This application claims the benefit of the filing date under 35 U.S.C. § 119(a)-(d) of India Patent Application No. 202241002555, filed on Jan. 17, 2022.

FIELD OF THE INVENTION

The invention relates to a housing part for an electrical connector. The invention further relates to an electrical connector, a set comprising an electrical connector and a complementary connector.

BACKGROUND

Housing parts for electrical connectors are known in the art. They can form part of a connector housing. Alternatively, in particular in the case where the housing part is formed monolithically with the remaining connector housing, the housing part may be the connector housing. An electrical connector can be used for accommodating electrical contacts. Such electrical contacts may be arranged in the opening of the housing part. In some cases, a maximum mating force may not be exceeded. There is a need to facilitate the mating of an electrical connector with a complementary connector.

SUMMARY

A housing part for an electrical connector includes a housing wall adjacent to an opening. The housing wall has a front edge with a chamfer on a side of the housing wall. The chamfer extends away from the front edge by a distance that varies along the front edge.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
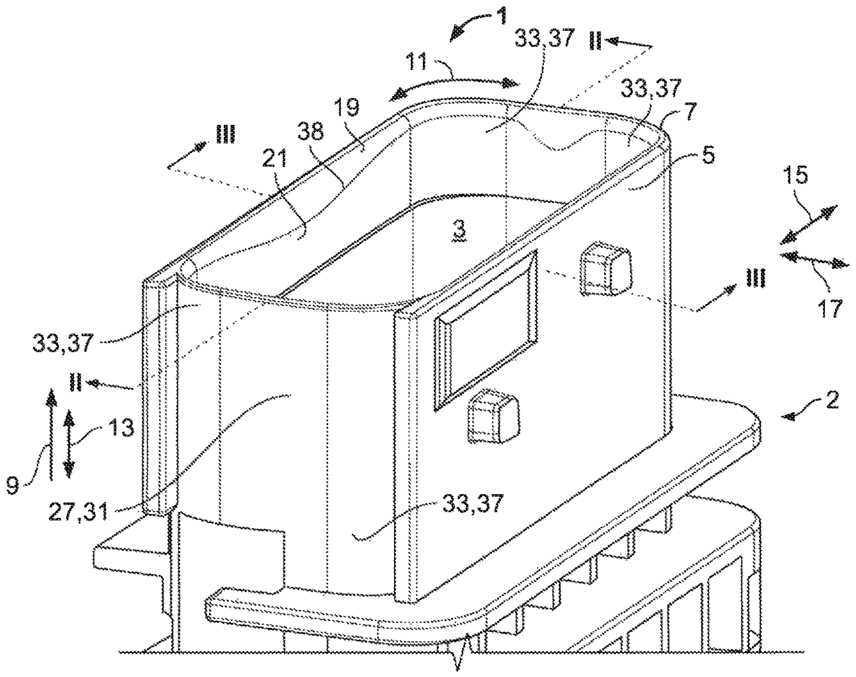
FIG. 1 is a perspective view of a housing part according to an embodiment.

In the following, the invention and its improvements are described in greater detail using exemplary embodiments and with reference to the drawings. The various features shown in the embodiments may be used independently of each other in specific applications. In the figures, elements having the same function and/or the same structure will be referenced by the same reference signs.

In the following, an exemplary embodiment of a housing part 1 is described with respect to FIGS. 1 to 3. The housing part 1, in an embodiment, is used as part of an electrical connector 2. The housing part has an opening 3 and at least one housing wall 5 adjacent to the opening 3. The housing wall 5 has a front edge 7. In an embodiment, the housing wall 5 and the front edge 7 extend continuously around the opening 3.

In an embodiment, the housing part 1 is configured to be mated with a complementary connector, wherein the front edge 7 is orientated towards the complementary connector before mating. Thus, the front edge 7 faces in the direction 9, which defines a plug direction 9 of the housing part 1. In an embodiment, the housing wall 5 extends along a circumferential direction 11, which extends perpendicular to the plug direction 9.

Considering that the plug direction 9 is parallel to a longitudinal direction 13 of the housing part 1, the housing part 1 can be regarded as extending also along a width direction 15 and a height direction 17, that extends perpendicular to the width direction 15. The width direction 15 and the height direction 17 both extend perpendicular to the longitudinal direction 13.

The opening 3 extends along the longitudinal direction 13 into the housing part 1 and is encircled by the housing wall 5 along the circumferential direction 11.

Figure 2:
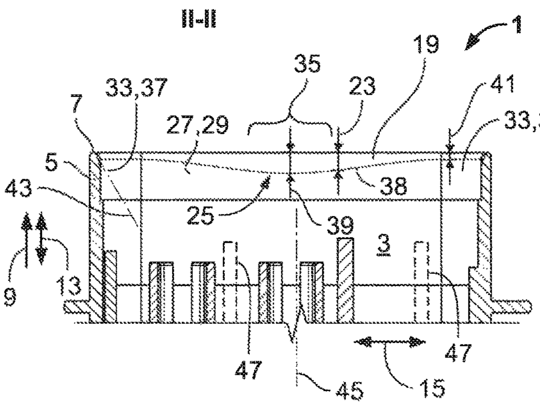
FIG. 2 is a sectional view of the housing part, taken along line II-II of FIG. 1.
Figure 3:
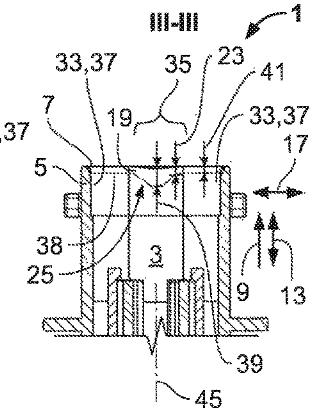
FIG. 3 is a sectional view of the housing part, taken along line III-III of FIG. 1.

As shown in FIGS. 1-3, the front edge 7 has a chamfer 19. The chamfer 19 extends away from the front edge 7 on one side 21 of the housing wall 5. The chamfer 19 extends away from the front edge 7 against the plug direction 9.

In the shown embodiment, the side 21 is the inner side of the housing wall 5 with respect to the opening 3. In an alternative embodiment, the side 21 having the chamfer 19 may be the outer side of the housing wall 5 and thus orientated away from the opening 3.

The chamfer 19 extends away from the front edge 7 along a distance 23 that is measured from the front edge 7 towards an end line 38 of the chamfer 19. In an embodiment, the distance 23 is measured along the plug direction 9.

In FIGS. 2 and 3, two examples of the distance 23 are shown. The distance 23 varies along the front edge 7. In other words, the distance 23 varies along the circumferential direction 11. In the shown embodiment, the distance 23 of the chamfer 19 varies in a wavelike manner along the front edge 7. Thereby, a wave trough 25 extends against the plug direction 9 away from the front edge 7.

The housing part 1 of the exemplary embodiment shows an overall polygonal form having a rectangular cross section with rounded corners. Thus, the housing wall 5 comprises four straight sections 27, of which two straight sections 27 form two long sides 29, the long sides 29 being parallel with and spaced apart from each other. The long sides 29 extend parallel with the widths direction 15. In an alternative to a polygonal shape, the housing part 1 may have an overall round or ellipsoid cross section.

Two other straight sections 27 form short sides 31 of the rectangular shape. The short sides 31 are spaced apart from and parallel with each other, and extend perpendicular to the long sides 29. The four straight sections 27 are interconnected by further sections 33. In the exemplary embodiment, the further sections 33 are curved sections 33. that form the rounded corners of the rectangular shape. The straight sections 27 comprise the mid-sections 35 of the housing wall 5 and the curved sections 33 comprise the border areas 37 of the housing wall 5. The at least one curved, bent or cornered further section 33 is arranged between two straight sections 27, interconnecting the two straight sections 27. A straight section 27, in an embodiment, extends over 15% to 100% of a connector width or a connector height.

In an embodiment, the housing part 1 has at least two straight sections 27 that are interconnected by at least one further section 33 that is one of curved, bent and cornered section, wherein the chamfer 19 extends continuously along the sections, and in an embodiment along all sections.

In an embodiment, the distance 23 is similar in all four curved sections 33 and does not vary in these sections. In the straight sections 27, however, the distance 23 varies along the front edge 7. In an embodiment, the end line 38 of the chamfer 19 has a wave-form in each of the four straight sections 27, wherein each wave trough 25 extends away from the front edge 7. Thus, a continuous chamfer with a continuous and smooth varying distance 23 can be achieved. The end line 38 can be the part of the chamfer 19 having the largest distance 23 from the front edge 7.

The distance 23 is longer in the mid-section 35 of each straight section 27. In other words, the chamfer 19 extends parallel with the front edge 7 in a curved section 33 and extends with an increasing distance in a straight section 27, until a maximum distance 39 is reached in a mid-section 35 of a straight section 27. Following the course of the chamfer 19 further, the distance 23 decreases until the chamfer 19 reaches the next curved section 33, where the distance 23 is at its minimum 41, as also in the other curved sections 33. In an embodiment, the maximum distance 39 is up to 5 times the minimum distance 41, and in another embodiment between 3 and 4 times the minimum distance 41.

The border areas 37 may be the lateral sides of the housing wall 5, which are spaced apart in a width direction 15 or in a height direction 17 of the housing part 1. In an embodiment, the distance is similar at the two border areas 37. The mid-section 35 may thus provide reduced friction during the beginning of a mating procedure. In addition, air can escape the opening at the mid-section 35 with the longer distance.

The chamfer 19 extends in a mirror symmetrical manner with respect to a mirror plane 45 extending through the mid-sections 35 of both straight sections 27. The mirror planes 45 are only indicated by dashed lines in FIGS. 2 and 3. The mirror plane 45 may extend parallel to a plug direction 9 and perpendicular to a circumferential direction 11.

Due to the varying distance 23, a chamfer inclination 43 also varies along the front edge 7. The inclination 43 is measured with respect to the direction in which the front edge 7 faces. This direction, in an embodiment, is the plug direction 9. The inclination 43 may vary due to the varying distance 23. However, the chamfer inclination 43 may also vary independently of the distance 23.

Contact elements 47 (indicated in FIG. 2) may be arranged in the opening 3 and may be configured to electrically contact counter contacts of a complementary connector.

Figure 4:
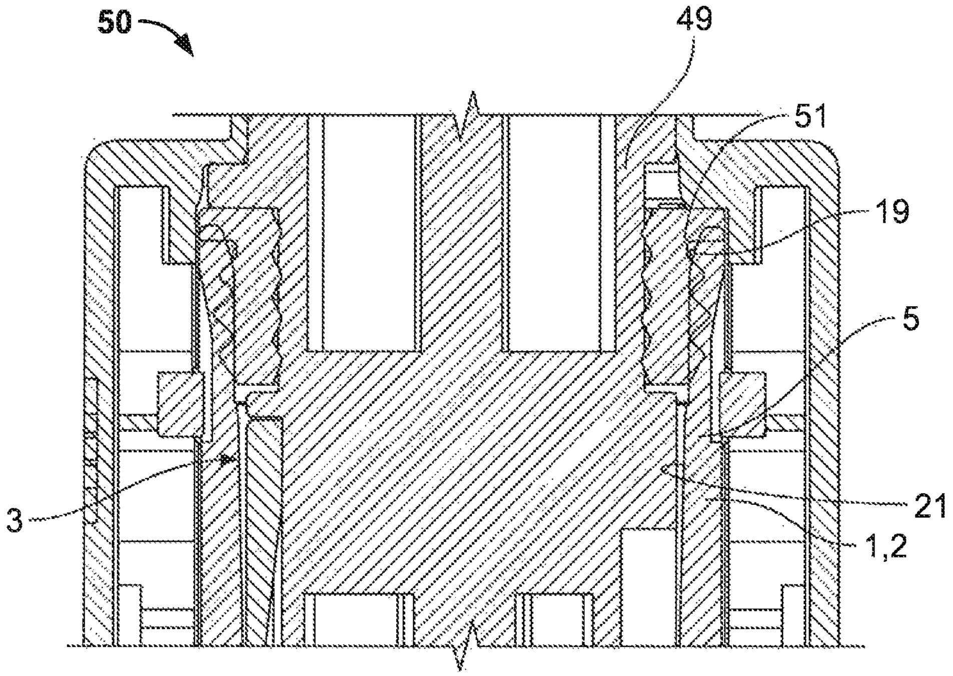
FIG. 4 is a sectional detail view of a connector having the housing part.

In the following, reference is made to FIG. 4 that shows a housing part 1 as part of an electrical connector 2 in a mated state with a complementary connector 49. The housing part 1 is the housing part 1 as described above with respect to FIGS. 1 to 3. The complementary connector 49 and the connector 2 may form a set 50.

The complementary connector 49 has a seal 51 that extends around a part of the connector 49. In the mated state, the seal 51 engages the housing wall 5 of the housing part 1. Thereby, seal 51 abuts the side 21 of the housing wall 5 that is provided with the chamfer 19.

The chamfer 19 allows air to escape the opening 3 during the insertion of the complementary connector 49 into the opening 3. During the start of the mating procedure, the complementary connector 49 does not yet engage sections of the housing wall 5 where the chamfer 19 has a long distance 23. Thus, in the regions between the housing wall 5 and the seal 51, air may escape.

In addition, the friction between the seal 51 and the housing wall 5 is reduced. Only during further mating, does the complementary connector 49 also engage parts of the front edge 7 having the chamfer 19 with longer distances. Another benefit is a reduced piston effect during mating. Air that is enclosed between the two connectors, in particular in the opening 3 of the housing part 1, can leave the connectors in the regions having longer chamfer distances. In regions with longer distances, air can escape from air vents formed between the two connectors In summary, the mating force between the connectors 2 and 49 is reduced due to the chamfer 19 having the varying distance 23. This is also shown in FIG. 5, which shows the mating force 53 in Newton over a displacement 55 in millimeters.

Figure 5:
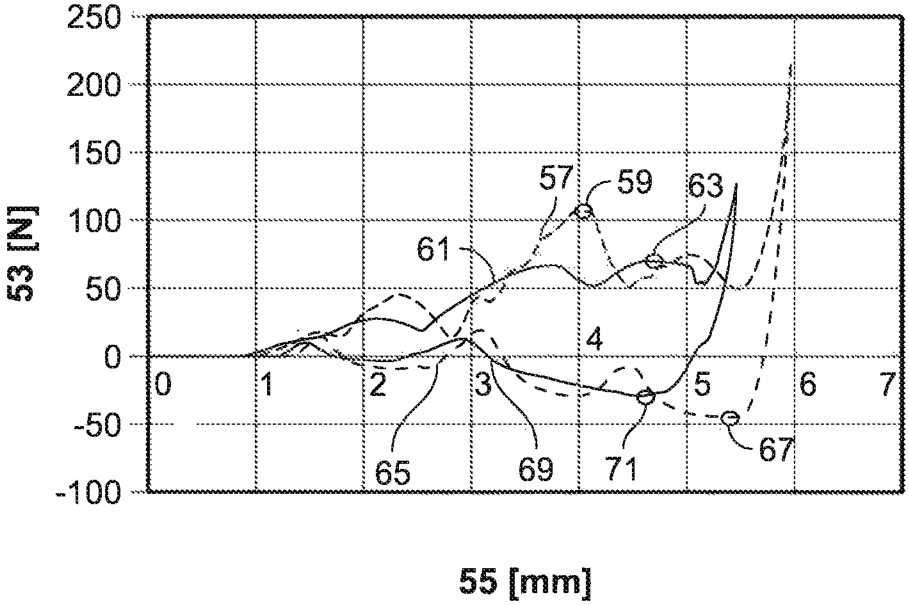
FIG. 5 is a graph of mating forces between different chamfers.

In FIG. 5, curve 57 shows the insertion force of a connector having a chamfer with a constant distance along a front edge. This curve 57 has a maximum 59 around 107 Newton.

Curve 61 shows the mating force of a connector that is provided with a housing part 1 according to the invention. Thus, the maximum 63 of the mating force is around 70 Newton. Hence, the mating force is reduced due to the improved chamfer 19.

Curve 65 shows the pull out force of a connector without the improved chamfer. The pull out force has its negative maximum 67 at 45 Newton.

On the other side, curve 69 shows the pull out force for a connector having the improved chamfer according to the invention. The negative maximum 71 of this curve 69 is at 30 Newton. Thus, the pull out force is reduced in comparison with the connector without the improved chamfer.

What is claimed is:

1. A housing part for an electrical connector, comprising:
a housing wall adjacent to an opening, the housing wall having a front edge with a chamfer on a side of the housing wall, the chamfer extends away from the front edge by a distance that varies along the front edge in a wave-like manner.

2. The housing part of claim 1, wherein the distance increases toward a mid-section of the housing wall.

3. The housing part of claim 2, wherein a variation of the distance along the front edge is mirror-symmetrical.

4. The housing part of claim 1, wherein the housing wall extends at least partly around the opening.

5. The housing part of claim 4, wherein the housing wall has a straight section and a further section, the further section is one of curved, bent, and cornered.

6. The housing part of claim 5, wherein the housing wall has at least two straight sections connected by the further section.

7. The housing part of claim 6, wherein the chamfer extends continuously along the straight sections and the further section.

8. The housing part of claim 1, wherein the housing part has an overall polygonal cross section formed by a plurality of straight sections.

9. The housing part of claim 8, wherein each of the straight sections has the chamfer.

10. The housing part of claim 1, further comprising a plurality of contact elements arranged in the opening, the contact elements electrically contact a plurality of counter contact elements of a complementary connector.

11. The housing part of claim 1, wherein the side of the housing wall having the chamfer is oriented toward the opening.

12. The housing part of claim 1, wherein an inclination of the chamfer varies along the front edge.

13. The housing part of claim 1, wherein the chamfer has a minimum distance and a maximum distance that is up to fives times the minimum distance.

14. An electrical connector, comprising:

a housing part including a housing wall adjacent to an opening, the housing wall having a front edge with a chamfer on a side of the housing wall, the chamfer extends away from the front edge by a distance that varies along the front edge in a wave-like manner.

15. A set, comprising:

an electrical connector with a housing part including a housing wall adjacent to an opening, the housing wall having a front edge with a chamfer on a side of the housing wall, the chamfer extends away from the front edge by a distance that varies along the front edge in a wave-like manner; and a complementary connector having a seal, the seal engages the side of the housing wall having the chamfer.

* * * * *